US008650910B2

(12) United States Patent
Kim et al.

(10) Patent No.: US 8,650,910 B2
(45) Date of Patent: Feb. 18, 2014

(54) APPARATUS FOR HOMOGENIZING A GLASS MELT

(75) Inventors: Hojong Kim, Arlington, MA (US); Daniel A. Nolet, Danville, KY (US)

(73) Assignee: Corning Incorporated, Corning, NY (US)

( * ) Notice: Subject to any disclaimer, the term of this patent is extended or adjusted under 35 U.S.C. 154(b) by 399 days.

(21) Appl. No.: 12/861,313

(22) Filed: Aug. 23, 2010

(65) Prior Publication Data

US 2012/0042693 A1    Feb. 23, 2012

(51) Int. Cl.
    C03B 5/18        (2006.01)
(52) U.S. Cl.
    USPC ............. 65/346; 65/347; 65/135.2; 65/135.3
(58) Field of Classification Search
    USPC ................ 65/29.19, 134.1, 135.1–135.4, 65/178–180, 355–356
    See application file for complete search history.

(56) References Cited

U.S. PATENT DOCUMENTS

| 2,081,935 | A | * | 6/1937 | Jones ............................. 501/85 |
| 2,569,459 | A | | 10/1951 | De Voe et al. ...................... 49/77 |
| 3,209,641 | A | * | 10/1965 | Upton ........................... 385/142 |
| 3,669,435 | A | * | 6/1972 | Silverberg ...................... 432/151 |
| 4,278,460 | A | | 7/1981 | Chrisman et al. ................ 65/134 |
| 4,339,261 | A | | 7/1982 | Walton et al. .................... 65/178 |
| 4,493,557 | A | | 1/1985 | Nayak et al. ................... 366/300 |
| 4,789,390 | A | * | 12/1988 | Kunkle et al. ..................... 65/27 |
| 7,735,340 | B2 | | 6/2010 | Burdette et al. ............. 65/135.2 |
| 2003/0101750 | A1 | | 6/2003 | Goller et al. ................. 65/135.3 |
| 2005/0082282 | A1 | | 4/2005 | Smrcek et al. ................ 219/679 |
| 2005/0109062 | A1 | * | 5/2005 | Stelle et al. .................... 65/32.1 |
| 2006/0042318 | A1 | * | 3/2006 | Burdette et al. ............. 65/134.2 |
| 2006/0242996 | A1 | * | 11/2006 | DeAngelis et al. ......... 65/134.1 |
| 2008/0011016 | A1 | | 1/2008 | Bergman et al. ............. 65/29.12 |
| 2008/0041109 | A1 | * | 2/2008 | Burdette et al. ............. 65/135.2 |
| 2008/0151687 | A1 | | 6/2008 | Adelsberg et al. ............ 366/279 |
| 2009/0217708 | A1 | * | 9/2009 | Deangelis et al. ........... 65/134.2 |
| 2010/0080078 | A1 | | 4/2010 | Goller et al. .................. 366/145 |
| 2010/0126225 | A1 | | 5/2010 | Ding et al. .................... 65/135.3 |

FOREIGN PATENT DOCUMENTS

| JP | 08301621 A | * | 11/1996 | ................ C03B 5/16 |
| JP | 09295815 A | * | 11/1997 | ............. C03B 5/167 |
| JP | 2002145626 | * | 5/2002 | ................ C03B 5/18 |

* cited by examiner

*Primary Examiner* — Jodi C Franklin

(74) *Attorney, Agent, or Firm* — Kevin M. Able

(57) ABSTRACT

The present invention is directed toward a method of reducing contamination of a glass melt in a stirring apparatus by an oxide material. The oxide material, such as platinum oxide, may be volatilized by the high temperature of the glass melt, and then condense on the inside surfaces of a stirring vessel, particularly the stirrer shaft and surrounding surfaces of the stirring vessel cover. A build-up of condensed oxide material may then be dislodged and fall back into the glass melt. Accordingly, an apparatus and method is provided that includes a heating element disposed adjacent an annular gap between the stirring vessel cover and the stirrer shaft. The heating element heats a surface of the stirring vessel cover bounding the annular gap and prevents condensation of volatile oxides that may flow through the annular gap.

8 Claims, 3 Drawing Sheets

APPARATUS FOR HOMOGENIZING A GLASS MELT

BACKGROUND OF THE INVENTION

1. Field of the Invention

The invention relates generally to a method of reducing contaminants in a glass melt, and more specifically to reducing condensation-formed contaminants during a glass stirring process.

2. Technical Background

Chemical and thermal homogeneity is a crucial part of good glass forming operations. The function of a glass melting operation is generally to produce glass with acceptable levels of gaseous or solid inclusions, but this glass usually has cord (or striae or ream) of chemically dissimilar phases. These non-homogeneous components of the glass result from a variety of normal occurrences during the melting process including refractory dissolution, melting stratification, glass surface volatilization, and temperature differences. The resulting cords are visible in the glass because of color and/or index differences.

One approach for improving the homogeneity of glass is to pass the molten glass through a vertically-oriented stirring apparatus located downstream of the melter. Such stirring apparatus are equipped with a stirrer having a central shaft rotated by a suitable driving force, such as a motor. A plurality of blades extends from the shaft and mix the molten glass as it passes from the top to the bottom of the stirring apparatus. The operation of such stir chambers should not introduce further defects into the resulting glass, specifically, defects arising from condensed oxides.

Volatile oxides in a glass stirring apparatus can be formed from any of the elements present in the glass and stirring apparatus. Some of the most volatile and damaging oxides are formed from Pt, As, Sb, B, and Sn. Primary sources of condensable oxides in a glass melt include hot platinum surfaces for $PtO_2$, and the glass free surface for $B_2O_3$, $As_4O_6$, $Sb_4O_6$, and $SnO_2$. By glass free surface what is meant is the surface of the glass which is exposed to the atmosphere within the stirring apparatus. Because the atmosphere above the glass free surface, and which atmosphere may contain any or all of the foregoing, or other volatile materials, is hotter than the atmosphere outside of the stirring apparatus, there is a natural tendency for the atmosphere above the free glass surface to flow upward through any opening, such as through the annular space between the stirrer shaft and the stirring vessel cover. Since the stirrer shaft becomes cooler as the distance between the stirrer shaft and the glass free surface increases, the volatile oxides contained with the stirring apparatus atmosphere can condense onto the surface of the shaft if the shaft and/or cover temperature are below the dew point of the oxides. When the resulting condensates reach a critical size they can break off, falling into the glass and causing inclusion or blister defects in the glass product.

Heating the shaft above the glass free surface has proven only partially successful in reducing particulate contamination in the glass melt, resulting only in a stratification of the condensation.

One prior art method of reducing contamination of the glass melt by condensates has been to dispose a disc-shaped shield between the glass free surface and upper portions of the stir chamber. However, such methods may make it difficult to control the temperature of the glass free surface, such as by heating the chamber cover above the glass. In addition, the joint between the shield and the stirrer shaft may serve as an additional source of condensate contamination.

SUMMARY

In one embodiment an apparatus 10 for stirring molten glass melt is disclosed comprising a stirring vessel 12 and a stirring vessel cover 14 positioned over the stirring vessel, a surface 40 of the stirring vessel cover 14 defining an aperture 38 through which a stirrer shaft 24 extends, thereby forming an annular gap 52 between the stirrer shaft 24 and the aperture-defining surface 40 of the stirring vessel cover 14, a first channel 48 formed in the stirring vessel cover 14 at the aperture-defining surface 40; and a first heating element 56 disposed in the first channel that heats the aperture-defining surface.

The stirring vessel cover 14 may further comprise a second channel 60 comprising a thermocouple 58 disposed therein, and wherein a sensing end 62 of the thermocouple is positioned proximate the aperture-defining surface 40. A sensing end of the thermocouple is preferably positioned to sense a temperature of the stirring vessel cover adjacent to the annular gap.

In some embodiments a platinum-containing cladding may be disposed over a surface 34 of the stirring vessel cover facing a free surface 28 of the molten glass 30. The stirring vessel cover further includes an additional channel 44 formed in a surface 34 of the stirring vessel cover facing the molten glass 30, and wherein a second heating element 42 is disposed in the additional channel 44.

In another embodiment, a method of stirring a molten glass 30 is described comprising flowing the molten glass into a stirring vessel 12, stirring the molten glass with a stirrer 16 extending through an aperture 38 defined by a surface 40 of a stirring vessel cover 14 positioned over the stirring vessel, thereby forming an annular gap 52 between the stirrer 16 and stirring vessel cover 14, and heating aperture-defining surface 40 of stirring vessel cover 14 with a heating element positioned adjacent to the aperture-defining surface 40.

The method may further comprise sensing a temperature within the annular gap 52 with a thermocouple 58 disposed within the stirring vessel cover 14. The sensed temperature can then be used to control the magnitude of an electrical current supplied to the heating element, thereby regulating a temperature of the aperture-defining surface and the annular gap 52 between the surface 40 and the stirrer shaft 24.

The invention will be understood more easily and other objects, characteristics, details and advantages thereof will become more clearly apparent in the course of the following explanatory description, which is given, without in any way implying a limitation, with reference to the attached Figures.

DETAILED DESCRIPTION

Figure 1:
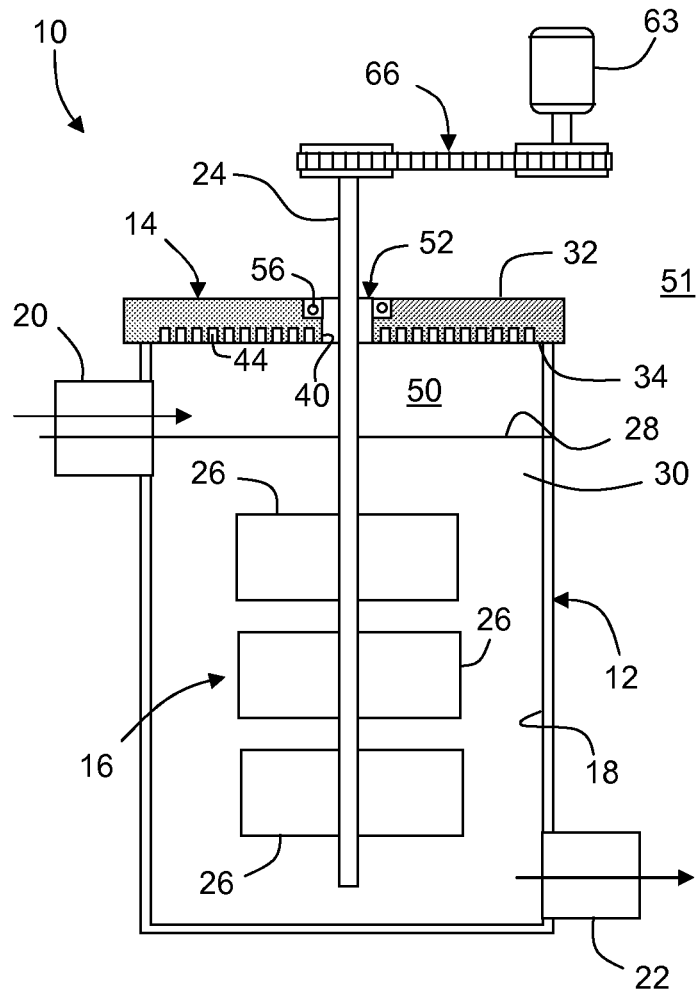
FIG. 1 is a cross sectional view of an exemplary stirring apparatus according to an embodiment of the present invention showing the stirring vessel cover and the annular gap heating elements.

FIG. 1 illustrates an exemplary apparatus for practicing a method for homogenizing a glass melt according to an embodiment of the present invention. Stirring apparatus 10 of FIG. 1 includes stirring vessel 12, stirring vessel cover 14 and stirrer 16.

Stirring vessel 12 is preferably cylindrically-shaped and substantially vertically-oriented, although the stirring vessel may have other shapes and orientations as needed. Preferably, the stirring vessel includes inner surface 18 comprising platinum or a platinum alloy. Other materials having resistance to high temperature, including resistance to corrosion, as well as electrical conductivity, may be substituted. For example, suitable metals for forming inner surface 18 can include other platinum group metals such as rhodium, iridium, palladium, ruthenium, osmium and alloys thereof. Stirring vessel 12 comprises molten glass inlet pipe 20 located at or near the top of stirring vessel 12 and molten glass outlet pipe 22 located near the bottom of the stirring vessel. However, it will be recognized by the skilled artisan that inlet pipe 20 and outlet pipe 22 may be reversed in some embodiments, such that the molten glass flows into the stirring apparatus from the bottom and flows out through the top of the stirring apparatus. Intermediate positions for the inlet and outlet pipes may also be employed provided adequate stirring (i.e. the desired amount of homogenization) is achieved.

Stirrer 16 comprises stirrer shaft 24 and a plurality of stirring blades 26 extending from stirrer shaft 24. Stirring blades 26 are typically submerged below free surface 28 of molten glass 30 during operation of the stirring apparatus. The molten glass surface temperature is typically in the range between about 1300° C. to 1500° C., but may be higher or lower depending upon the glass composition. Stirrer 16 preferably comprises platinum, and may be a platinum alloy or dispersion-strengthened platinum (e.g., a zirconia-strengthened platinum alloy).

Figure 2:
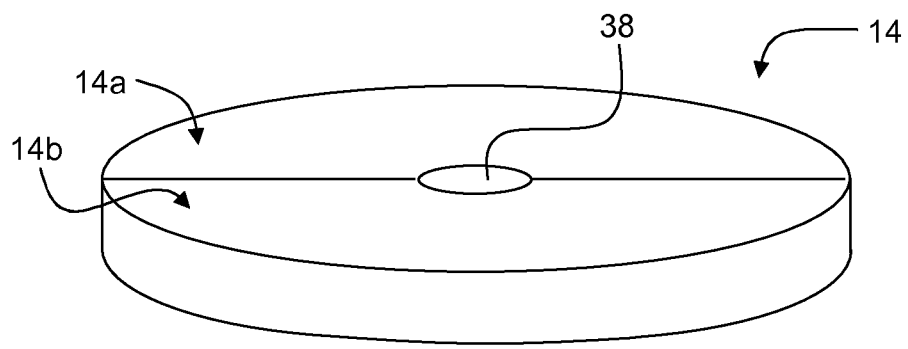
FIG. 2 is a perspective view of an embodiment of the stirring vessel cover of FIG. 1 formed in two segments.

Stirring vessel cover 14 covers an upper open end of stirring vessel 12, and includes an upper surface 32 and a lower surface 34. Lower surface 34 may further include a cladding material 36 (see FIG. 4) positioned over lower surface 34 to protect lower surface 34 from the corrosive atmosphere above the free surface of the molten glass. For example, lower surface 34 may include a platinum or platinum alloy (e.g. platinum-rhodium) cladding. Stirring vessel cover 14 defines an aperture 38 (FIG. 2) extending through a thickness of the stirring vessel cover and through which stirrer shaft 24 extends. Aperture 38 is bounded by an aperture-defining surface 40, of stirring vessel cover 14. In some embodiments, stirring vessel cover 14 may be formed in a plurality of segments to facilitate easy removal and replacement of the stirring vessel cover, such as during a rebuilding of the stirring apparatus. For example, in the embodiment illustrated in FIG. 2, stirring vessel cover 14 is shown having two segments, stirring vessel first cover segment 14a and stirring vessel second cover segment 14b.

Figure 3:
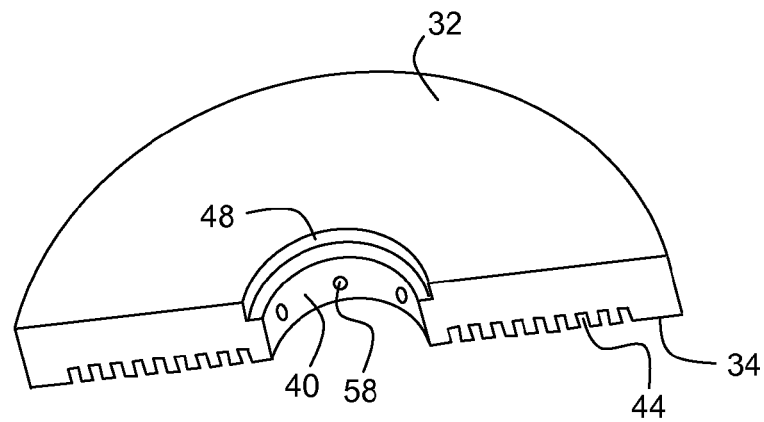
FIG. 3 is a perspective view of one segment of the stirring vessel cover of FIG. 2 showing a channel in a surface defining a central aperture of the cover for heating that surface, and channels formed in a bottom surface of the cover for receiving cover bottom heating elements.
Figure 4:
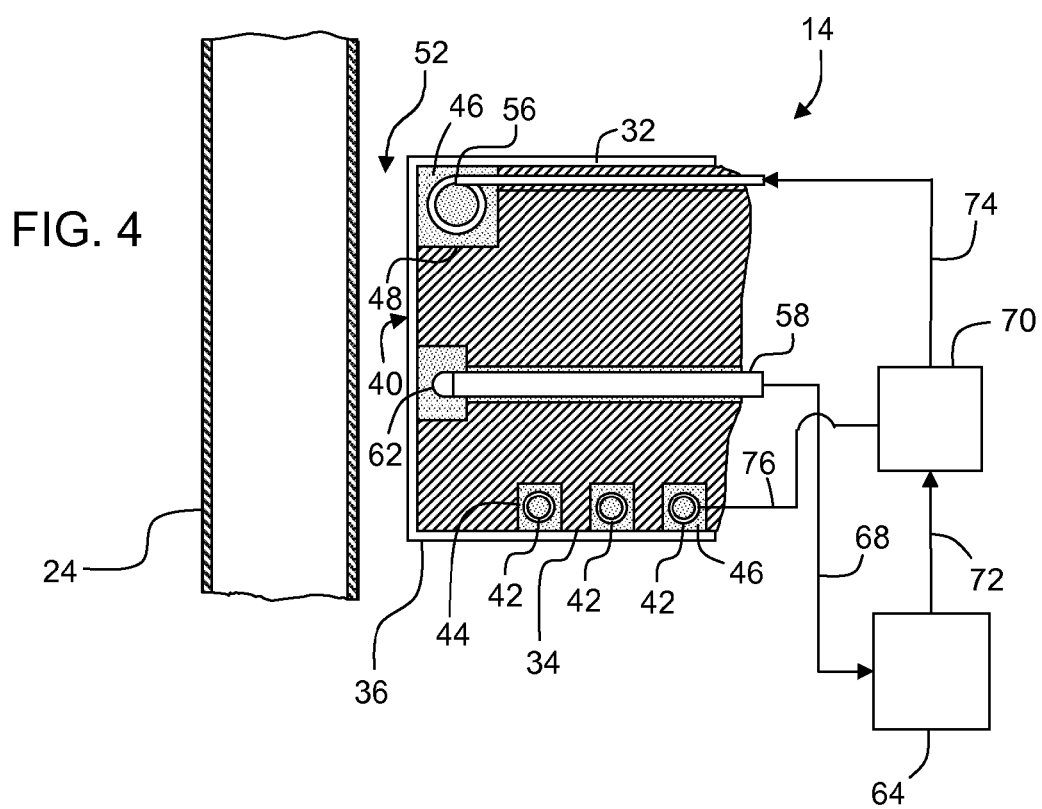
FIG. 4 is a cross section view of a portion of a stirring vessel cover according to an embodiment of the present invention illustrating the channels of FIG. 3 containing the bottom surface heating elements and the aperture-defining surface of the cover, and further showing a metallic cladding material disposed over surfaces of the cover.

As best shown in FIGS. 3 and 4, stirring vessel cover 14 may also include one or more heating elements 42 embedded at lower surface 34 of the stirring vessel cover. Heating elements 42, typically in the form of a metallic coil, rod or ribbon, are disposed in one or more channels 44 formed in lower surface 34 of stirring vessel cover 14. In some embodiments, lower surface 34 includes a single channel 44 through which a single heating element 42 extends. For example, the channel may form a generally spiral shape. However, the use of a single heating element 42 is solely for ease in manufacture and maintenance, and the use of a plurality of heating elements, disposed in one or more channels 44, can be employed. In the instance where stirring vessel cover 14 is formed in one or more segments, at least two heating elements 42 are disposed in at least two channels 44, at least one channel for each segment, which simplifies removal of the stirring cover segments. The one or more heating elements 42 may be secured within channel 44 by refractory cement 46.

Stirring vessel cover 14 further includes a second channel 48 formed around at least a portion of aperture 38. That is, channel 48 is formed in at least a portion of stirring vessel cover 14 that defines aperture 38. Channel 48 is preferably positioned adjacent the upper portion of aperture 38 farthest from the surface of the molten glass during operation of the stirring apparatus and adjacent to upper surface 32. Because the temperature of inner atmosphere 50 within stirring vessel 12 and above molten glass free surface 28 is significantly higher than the temperature of external atmosphere 51 outside stirring apparatus 10, a chimney effect is created and hot gases from inner atmosphere 50 vent through annular gap 52 formed by stirrer shaft 24 and the aperture-defining surface 40 of stirring vessel cover 14. These gases can include volatilized materials from the molten glass itself, or volatilized materials (e.g. platinum) from the stirrer and/or the stirring vessel. These volatilized materials can condense onto the surface of the stirring vessel cover and, if allowed to grow sufficiently large, break off and become entrained in the molten glass.

Figure 5:
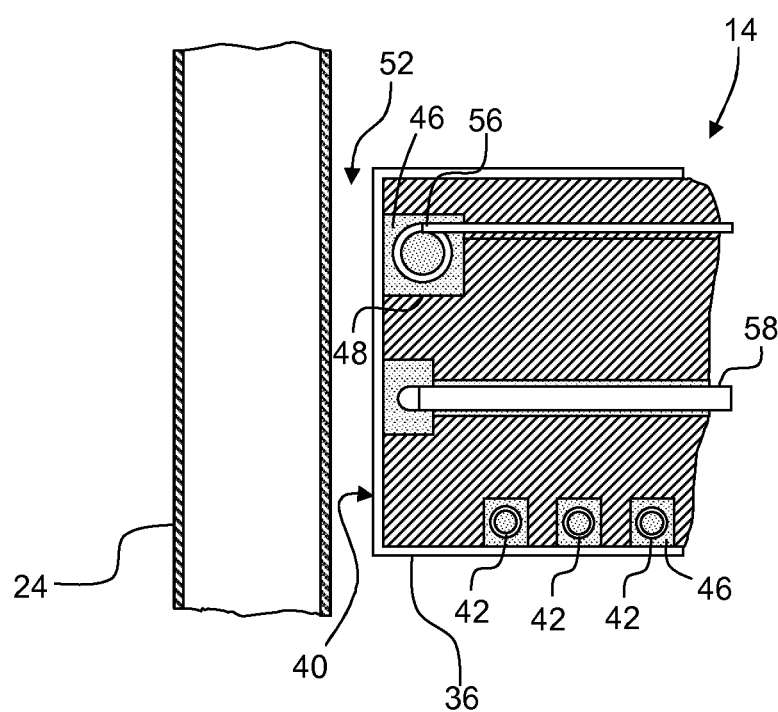
FIG. 5 is a cross section view of a portion of a stirring vessel cover according to another embodiment of the present invention illustrating the channels of FIG. 3 containing the bottom surface heating elements and the aperture-defining surface of the cover, wherein the channel at the surface of the aperture defining surface of the stirring vessel is positioned at a median location rather than an upper edge portion of the cover.

Of course, channel 48 can be placed at any vertical position within aperture 38 (FIG. 5). However, absent any other heat sources, those portions of stirring vessel cover 14 farthest from the hot molten glass are cooler than those portions of the stirring vessel cover closer to the molten glass and the upper reaches of the aperture tend to be the coolest. Thus, condensates are more likely to form at the stirring vessel cover surfaces near the upper reaches of the aperture, farthest from the molten glass surface. These stirring vessel cover surfaces can include both surface 40 defining aperture 38, and surfaces of stirring vessel shaft 24 within aperture 38. To heat these surfaces, one or more heating elements 56 are positioned within channel 48 to heat both surface 40, and the outer surface of stirrer shaft 24 extending through aperture 38. To stabilize the one or more heating elements 56, refractory cement 46 may be included in channel 48 to hold the heating element in place. Additionally, a cladding of platinum or platinum alloy disposed over portions of the stirring vessel cover such that channel 48 and encloses heating element 56 within the channel are covered by the cladding. The cladding may be an extension of cladding 36 formed over lower surface 34. As used herein, aperture-defining surface 40 is either a surface of the refractory material of the stirring vessel cover itself, or in the instance where a cladding material is disposed over the refractory surface, the aperture defining surface 40 is the cladding surface circumscribing the aperture.

To monitor temperature at annular gap 52, and if desired assist in automatic control of heating element 56 and/or heating element 42, one or more thermocouples 58 may be included in stirring vessel cover 14. As shown in FIG. 4, in some embodiments, a channel 60 may be formed through an interior of stirring vessel cover 14 and extending to, or at least near to, surface 40. That is, the thermocouple preferably is not exposed to the atmosphere extending through gap 52, but is close enough to the gap atmosphere the surface exposed to the gap surface that a temperature of the surface contacting the atmosphere in gap 52 can be reasonably determined. Thermocouple 58 is disposed in channel 60. Thermocouple channel 60 is shown in FIG. 4 as including refractory cement 46 to secure the thermocouple within channel 60. However, since the refractory cement may interfere with the temperature sensing performance of thermocouple 58, and makes replacement of the thermocouple difficult, the refractory cement may be excluded from the thermocouple channel if desired. Also, as shown in FIG. 4, cladding material 36 is positioned between the thermocouple sensing end 62 and stirrer shaft 24. Put more simply, thermocouple 58 can be covered by cladding material 36 in a manner similar to the way in which heating element 56 is covered by the cladding.

During operation, a motor 63 coupled to stirrer shaft 24 through linkage 66 rotates stirrer 16. Linkage 66 may for example include a chain and related sprockets connected to both the motor and the stirrer shaft. Molten glass 30 supplied to stirring apparatus 10 through inlet pipe 20, is stirred and homogenized by stirrer 16, and flows out the stirring apparatus through outlet pipe 22. Control of the temperature at surface 40 and within annular gap 52 can be achieved with the use of a control circuit, as illustrated in FIG. 4. The temperature at surface 40 is sensed by the sensing end 62 of thermocouple 58. An electrical signal is generated by the thermocouple and delivered to controller 64 via line 68. Controller 64 interprets the electrical signal as a temperature according to a predetermined conversion factor, and compares the resultant temperature to a predetermined temperature set point. If the sensed temperature is less than the set point temperature, controller directs power source 70 via line 72 to deliver a flow of current through line 74 to heating element 56. Once the sensed temperature reaches the set point temperature, the controller directs the power source to reduce or extinguish the current flow. Of course other control schemes are possible, and the foregoing is but one method of implementation. Heating element 42 is similarly controlled by controller 64 via power source 70 and line 76.

It will be apparent to those skilled in the art that various other modifications and variations can be made to the present invention without departing from the spirit and scope of the invention. Thus it is intended that the present invention cover the modifications and variations of this invention provided they come within the scope of the appended claims and their equivalents.

What is claimed is:

1. An apparatus for stirring molten glass melt comprising:
    a stirring apparatus including a stirring vessel and a stirring vessel cover positioned over the stirring vessel, the stirring vessel cover comprising a first segment and a second segment, wherein a surface of the stirring vessel cover defines an aperture through which a stirrer shaft extends, thereby forming an annular gap between the stirrer shaft and the aperture-defining surface of the stirring vessel cover;
    a first channel formed in an upper portion of the aperture-defining surface directly adjacent to the aperture-defining surface;
    a first heating element disposed in the first channel that heats the aperture-defining surface;
    a second channel formed in a lower surface of the first segment of the stirring vessel cover, the second channel facing and opening towards a free surface of the molten glass melt;
    a second heating element disposed in the second channel that heats the free surface of the molten glass melt;
    a third channel formed in a lower surface of the second segment of the stirring vessel cover, the third channel facing and opening towards the free surface of the molten glass melt; and
    a third heating element disposed in the third channel that heats the free surface of the molten glass melt.

2. The apparatus according to claim 1, wherein the stirring vessel cover further comprises a thermocouple channel comprising a thermocouple disposed therein, and wherein a sensing end of the thermocouple is positioned proximate the aperture-defining surface.

3. The apparatus according to claim 1, wherein a platinum-containing cladding is disposed over a surface of the stirring vessel cover facing a free surface of the molten glass.

4. The apparatus according to claim 1, wherein a sensing end of the thermocouple is positioned to sense a temperature of the stirring vessel cover adjacent to the annular gap.

5. An apparatus for stirring a molten glass melt comprising:
    a stirring apparatus including a stirring vessel and a stirring vessel cover positioned over the stirring vessel, the stirring vessel cover comprising a first segment and a second segment, wherein a surface of the stirring vessel cover defines an aperture through which a stirrer shaft extends, thereby forming an annular gap between the stirrer shaft and the aperture-defining surface of the stirring vessel cover;
    a first channel formed in an upper portion of the aperture-defining surface directly adjacent to the aperture-defining surface;
    a first heating element disposed in the first channel that heats the aperture-defining surface;
    a second channel formed in a lower surface of the first segment of the stirring vessel cover, the second channel facing and opening towards a free surface of the molten glass melt;
    a second heating element disposed in the second channel that heats the free surface of the molten glass melt;
    a third channel formed in a lower surface of the second segment of the stirring vessel cover, the third channel facing and opening towards the free surface of the molten glass melt;
    a third heating element disposed in the third channel that heats the free surface of the molten glass melt; and
    a platinum cladding formed over the lower surface of the stirring vessel cover and the aperture-defining surface of the stirring vessel cover.

6. The apparatus according to claim 5, wherein at least one of the second channel and the third channel is spiral-shaped.

7. The apparatus according to claim 5, further comprising:
    at least one additional channel formed in the lower surface of the first segment of the stirring vessel cover or the lower surface of the second segment of the stirring vessel cover; and
    at least one additional heating element disposed in the at least one additional channel.

8. An apparatus for stirring a molten glass melt comprising:
    a stirring apparatus including a stirring vessel and a stirring vessel cover positioned over the stirring vessel, the stirring vessel cover comprising a first segment and a second segment, wherein a surface of the stirring vessel cover defines an aperture through which a stirrer shaft extends, thereby forming an annular gap between the stirrer shaft and the aperture-defining surface of the stirring vessel cover;
a first channel formed in an upper portion of the aperture-defining surface directly adjacent to the aperture-defining surface;
a first heating element disposed in the first channel that heats the aperture-defining surface, wherein the first heating element is secured within the first channel with refractory cement;
a thermocouple channel opening into the aperture in the stirring vessel cover;
a thermocouple disposed in the thermocouple channel and oriented such that a sensing end of the thermocouple is positioned proximate the aperture-defining surface;
a second channel formed in a lower surface of the first segment of the stirring vessel cover, the second channel facing and opening towards a free surface of the molten glass melt;
a second heating element disposed in the second channel that heats the free surface of the molten glass melt;
a third channel formed in a lower surface of the second segment of the stirring vessel cover, the third channel facing and opening towards the free surface of the molten glass melt;
a third heating element disposed in the third channel that heats the free surface of the molten glass melt; and
a platinum cladding formed over the lower surface of the stirring vessel cover and the aperture-defining surface of the stirring vessel cover, wherein the platinum cladding is positioned between the sensing end of the thermocouple and the aperture of the stirring vessel cover, between the first heating element and the aperture of the stirring vessel cover, between the second heating element and the free surface of the molten glass melt, and between the third heating element and the free surface of the molten glass melt.

* * * * *